Aug. 7, 1956  G. G. ENSIGN ET AL  2,757,555
PAWL AND RATCHET MECHANISM

Filed Aug. 4, 1953  5 Sheets-Sheet 1

INVENTORS
George G. Ensign,
Glenn T. Soper and
Ossian Lundahl

BY Mason, Porter, Diller & Stewart
ATTORNEYS

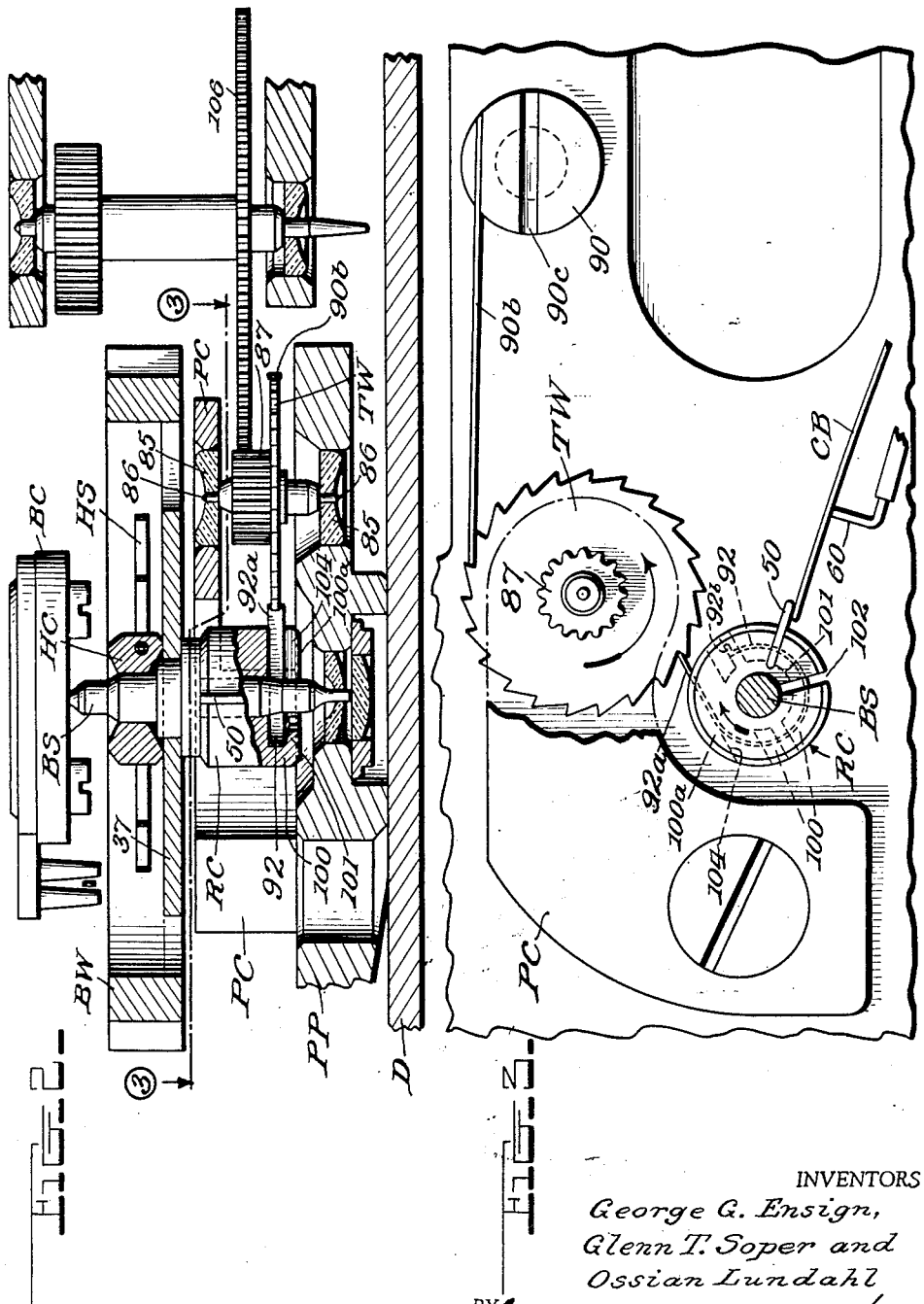

Aug. 7, 1956    G. G. ENSIGN ET AL    2,757,555
PAWL AND RATCHET MECHANISM
Filed Aug. 4, 1953    5 Sheets-Sheet 3
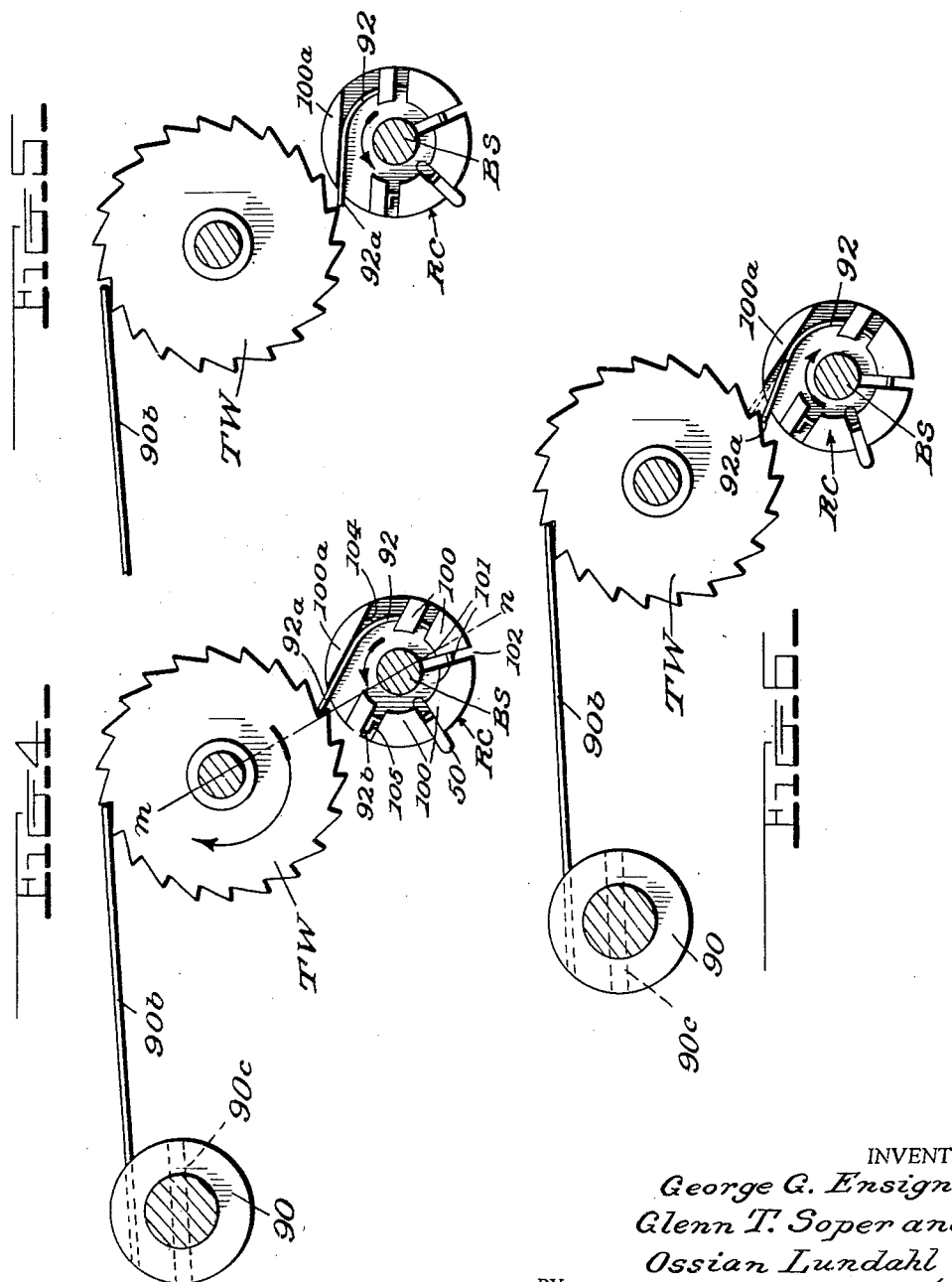
INVENTORS
George G. Ensign,
Glenn T. Soper and
Ossian Lundahl
BY Mason, Patau, Miller & Stewart
ATTORNEYS Aug. 7, 1956  G. G. ENSIGN ET AL  2,757,555
PAWL AND RATCHET MECHANISM
Filed Aug. 4, 1953  5 Sheets-Sheet 4
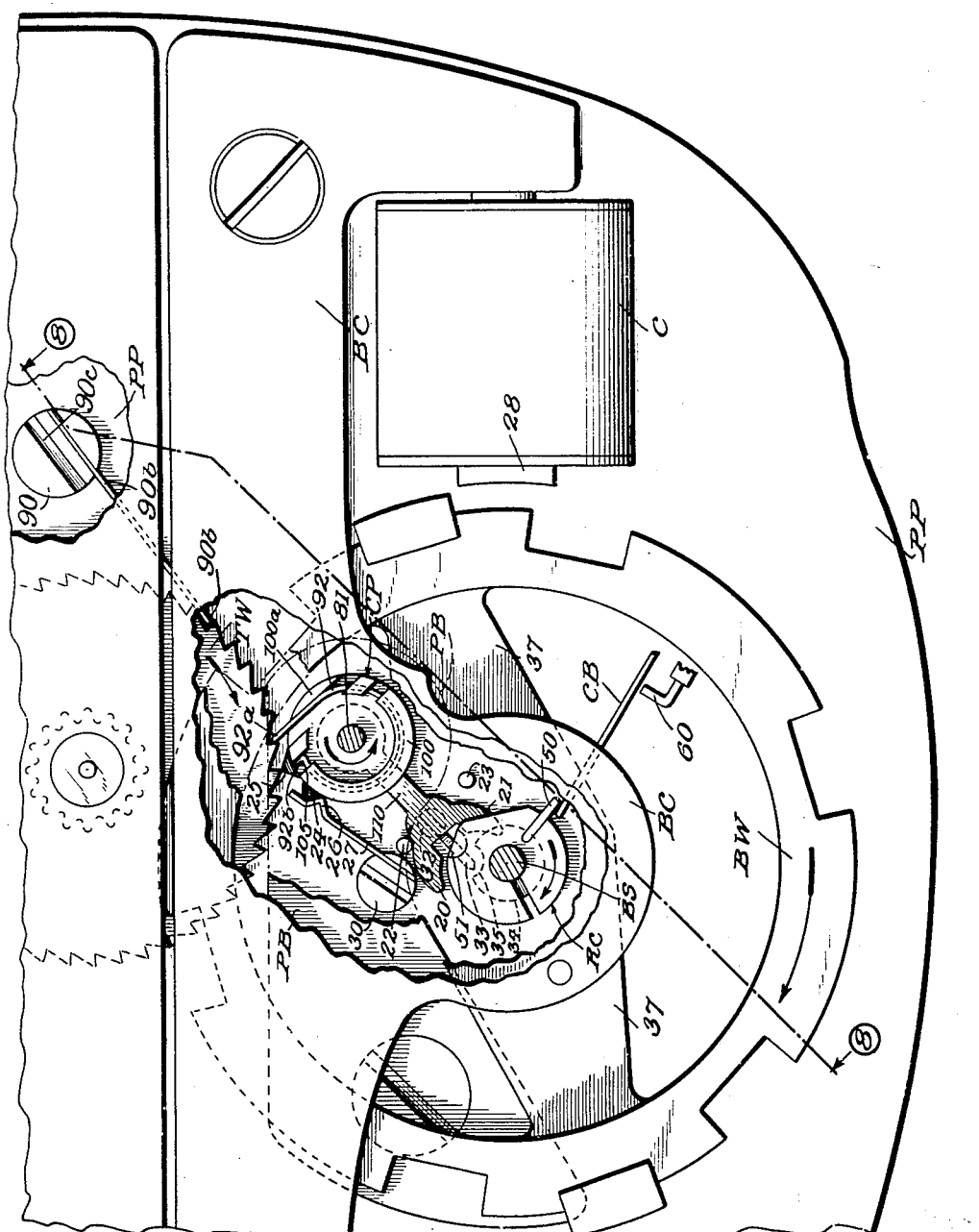
INVENTORS
George G. Ensign,
Glenn T. Soper and
Ossian Lundahl
BY Mason, Porter, Miller & Stewart
ATTORNEYS

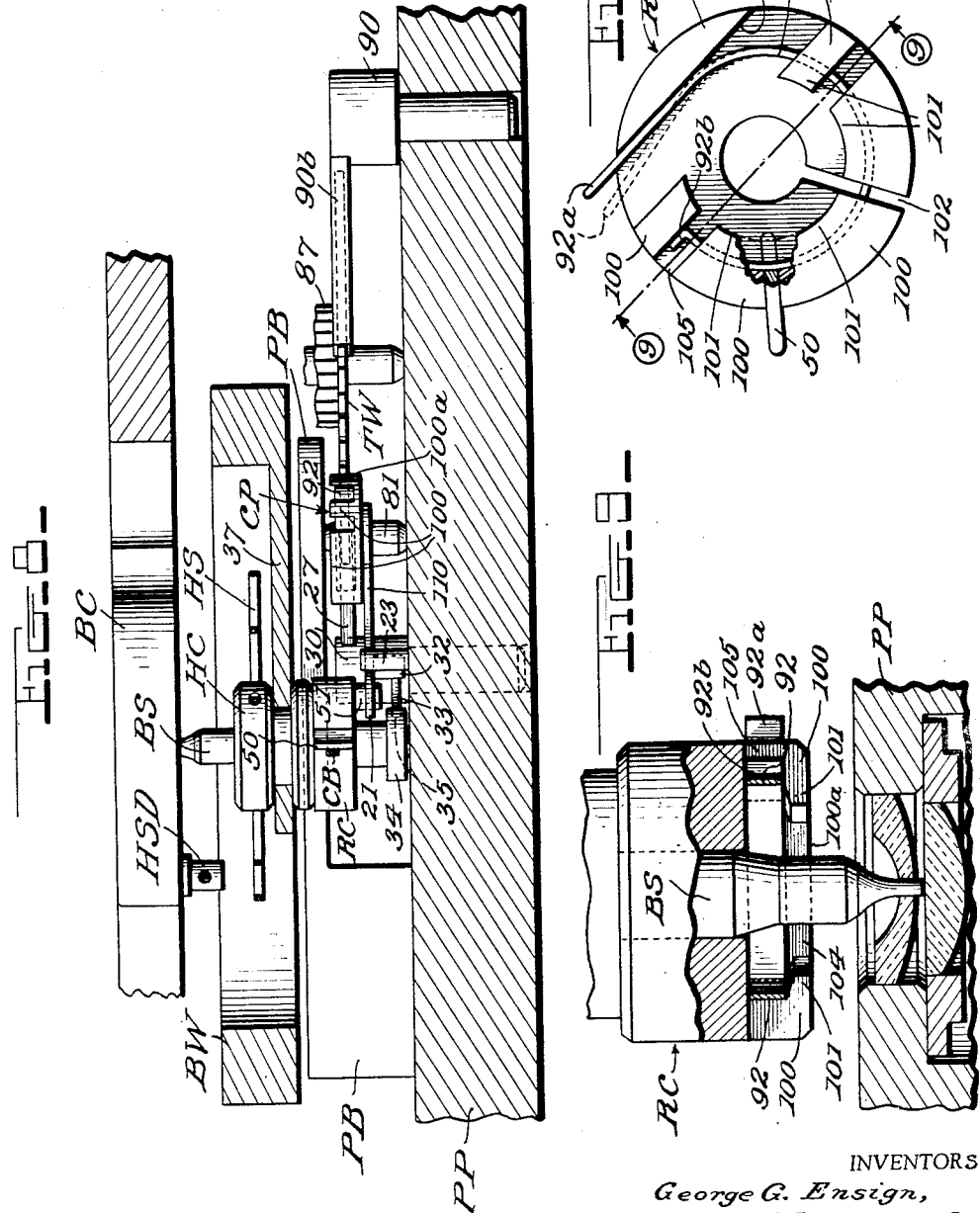

United States Patent Office 2,757,555
Patented Aug. 7, 1956

2,757,555

PAWL AND RATCHET MECHANISM

George G. Ensign and Glenn T. Soper, Elgin, Ill., and Ossian Lundahl, Orlando, Fla., assignors to Elgin National Watch Company, Elgin, Ill., a corporation of Illinois Application August 4, 1953, Serial No. 372,318

9 Claims. (Cl. 74—575)

The present invention concerns improvements in devices by which power is transferred from an independently driven balance or like time-interval-counting device, to a train or like arrangement for indicating the time interval counted.

A feature of the invention is the employment in association with the counting device of a novel arrangement including a resilient element which during a forward stroke engages and moves a transfer wheel, and which yields during the return stroke to pass the transfer wheel.

Another feature of the invention is the provision of a power take-off arrangement for a balance or like horological rate-determining device, with a spring element, which is curled to occupy a small space and which cooperates with a transfer wheel to move the same during the forward stroke and which yields during the return stroke for passing the transfer wheel.

A further feature of the invention is the provision of a spring device moved by the independently driven balance of a horological instrument, which cooperates with a transfer wheel for advancing a train or like time-counting arrangement, and which requires no special element for determining an exact oriented presentation of the transfer wheel at the moment when it is to be encountered by the actuating part on the balance.

A feature of the invention is the provision of an assembly of a rate-determining oscillatory element, and a piece mounted to rock with said element and having an internal recess, a spring actuator in said recess and having an end projecting therefrom, and a transfer means moved by said end.

A further feature is the provision of an assembly of an oscillatory rate-determining element, a rocking member reciprocated thereby, a train including a transfer wheel, means carried by the rocking member for advancing the transfer wheel during one stroke of an oscillation and ineffectively passing the same during the other stroke thereof, and means for preventing retrograde movement of the train.

Another feature is the provision of an electrically actuated watch structure including a balance and devices for delivering impulses thereto at a time determined by the position of the balance in its oscillating cycle through momentary electrical circuit closure, a train including a transfer element actuated from the balance through a rocking member, and a stop included with the rocking member for preventing a second impulsing upon excessive amplitude in a stroke of the cycle.

A further feature is the provision of a horological structure including a balance, a pin oscillated with the balance, a pallet actuated by the pin, overbanking stops to limit the pallet movement, a spring rocked with the pallet, and a train including a transfer wheel having ratchet teeth intermittently advanced by the spring.

With these and other features as objects in view, illustrative forms of practice of the invention are shown in the accompanying drawings, in which:

Fig. 2 is a fragmentary sectional view, substantially on broken line 2—2 of Fig. 1, on a larger scale and through the balance and transfer wheel axes.

Fig. 3 is a sectional view, substantially on line 3—3 of Fig. 2, showing the actuator carried by the balance, in a position of initial driving engagement with the transfer wheel.

Fig. 4 is a diagrammatic view, from the reverse side of that shown in Fig. 3, on a larger scale, to show the parts at the beginning of the driving engagement.

Figure 1:
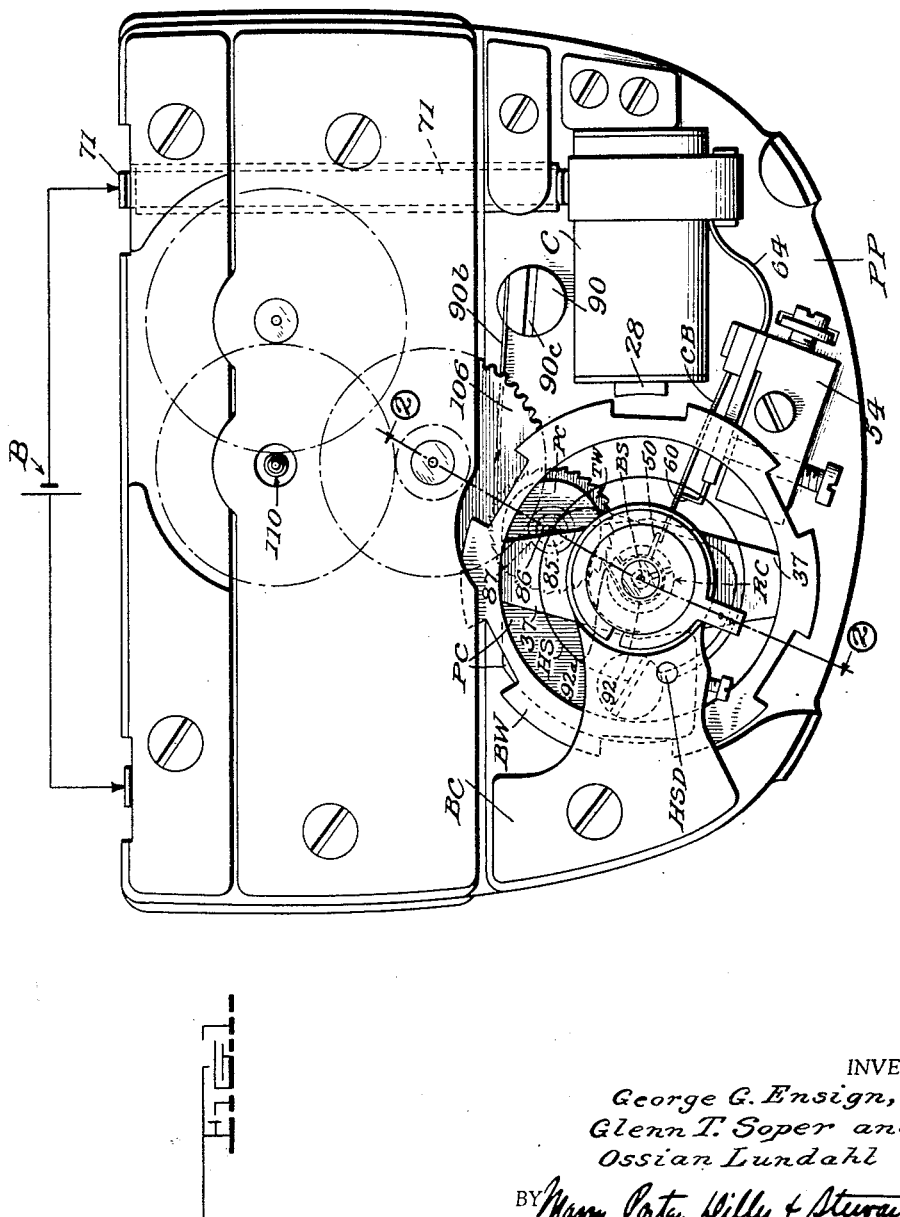
Fig. 1 is a plan view of a watch movement including an electrically actuated balance and a train.

Fig. 5 corresponds to Fig. 4, but with the actuator advanced until it is ready to escape the transfer wheel during the forward stroke.

Fig. 6 corresponds to Figs. 4 and 5, but with the actuator about to perform its passing action during the return stroke.

Fig. 7 is a view corresponding to Fig. 3, but showing a different embodiment in which the actuator is carried by a pallet.

Fig. 8 is a sectional view, substantially on line 8—8 of Fig. 7.

Fig. 9 is a section through an actuator structure, substantially on line 9—9 of Fig. 10, with the actuator in place.

Fig. 10 is a bottom view of such actuator structure with the actuator spring thereon.

The illustrative forms of execution of the invention are based on the showing of an independently driven, i. e. electrically actuated, balance in the copending application Ser. No. 282,388 of Ensign, Soper and Lundahl, filed April 15, 1952, but it will be understood that this embodiment is illustrative only.

In these drawings, a plate structure PP supports a coil C and a contact block 54 from which a spring contact blade CB projects toward the axis of the balance staff BS. A side contact 60, cooperative with the blade CB, is insulatedly carried by block 54 and is connected by conductor 64 to one terminal of the coil C: the other terminal of the coil being connected by a conductor 71 insulatedly carried by plate PP to a pole of an electrical battery B (conventionally shown), with the other pole of the battery connected to the contact blade CB, e. g. through the plate PP and block 54. During the movement of the balance, the contact blade CB is moved by a contact fin 50 on the balance collet RC, so that during the forward or clockwise stroke, as indicated by the arrow in Figs. 3, 4, 5 and 6, it is caused to engage the side contact blade 60 to close a circuit and cause a momentary energization of the coil C, so that this in turn energizes the pole piece 28 to exert a magnetic effort of impulsing the magnetizable balance wheel BW, likewise supported on the balance staff BS by the arm 37.

The balance staff BS is supported in the motor pillar plate PP and in the balance cock BC in usual fashion by bearings of which one is shown in Fig. 2. The hairspring HS is connected to the hairspring collet HC and to a stud HSD on the balance cock, in usual fashion.

The plate PP (Fig. 1) with associated bridges also supports the various wheels and parts of a train, including the wheel 106 and the center staff structure 110, so that the latter is turned in regular succession, for moving hands opposite a dial D (Fig. 2). Thus, each element of the train is in effect an integrating indicator of the balance oscillations.

According to the present invention, the bridge PC carried by the plate PP supports a rotary transfer member having a staff with the end pivots 86 carried by bearings 85, wherewith the axes of the balance staff BS and the transfer staff are parallel. This staff includes a pinion 87 in mesh with the wheel 106: and it also supports a transfer wheel TW formed with ratchet teeth at its periphery.

A resilient element 92, e. g. a spring, is located in the plane of and serves as an actuator for the transfer wheel TW and extends arcuately and preferably concentrically about an axis for about 270 degrees, the tangential free end 92a being directed chordally relative to the balance structure so that it projects with its tip into the path of the ratchet teeth of the transfer wheel TW. In the form shown in Figs. 1–6, the spring 92 extends in a plane about the balance axis and is carried by a collet structure which illustratively (Fig. 2) may be integral with the roller collet RC. This collet structure (Figs. 9 and 10) includes projections 100 with inturned lips 101 which provide an inwardly extending flange defining an interrupted inwardly open recess for receiving the spring 92.

The collet RC may be made by turning to size and shape, forming a cavity at one end while leaving an inwardly extending flange for providing the projections 100, and with a recess at the cylindrical inner surface of this cavity for providing the lips 101, the recess having a bottom dimension for receiving the curved blade spring actuator 92. The collet is then milled chordally across at its end by a narrow and a wide cutter gauged to cut through the aforesaid flange to the floor of the indentation, thereby forming the spaced projections 100: and the axial cuts for the elasticity slit 102 and for receiving the contact fin 50 are made. For stiffness, the actuator spring 92 is closely engaged in the recess for about 180 degrees of arc (Fig. 10): preferably the end 92b is an outward bent portion lying in the locating notch 105 between two projections 100, for preventing slippage of the actuator 92 in the peripheral direction. The projection 100a is also formed from the flange with the projections 100 and has a chordal face 104 for engaging the chordal end 92a of the actuator and supports the same against major outward movement while (Figs. 4 and 5) the actuator is driving the transfer wheel TW.

It will be noted that no securing means is required to maintain the actuator spring 92 in the collet piece, as the spring expands by its own resiliency into the aforesaid recess or groove and is held therein between the cavity floor and the lips 101.

A frictionally-held rotatable stud 90 (Figs. 1, 3–6) on the plate PP has a first chordal kerf in its end, in which is secured the detent spring 90b which extends for engagement with the successive ratchet teeth of the transfer wheel TW. The stud 90 also has a diametrical kerf 90c (Fig. 3) which may be engaged by a screwdriver for rotating the stud and thereby determining the position of the detent 90b in the absence of the transfer wheel TW and therewith the pressure which it exerts upon the teeth thereof during operation.

In operation, as the balance swings in its forward or counterclockwise stroke in Figs. 1, 3, 4 and 5, the contact fin 50 strikes the contact blade CB closely at neutral axis, that is, about half-way in the forward stroke and at a time when the balance is at maximum velocity. The circuit is closed, and the impulse delivered to the balance closely at the neutral axis and hence with a minimum disturbance of its rate.

Concurrently with the closure of the electrical circuit, the outer end 92a of the spring actuator 92 engages the radial face of a ratchet tooth on the transfer wheel TW (Fig. 4) and pushes the transfer wheel in front of it, moving the transfer wheel in a relative clockwise direction as shown by the arrow in Fig. 4, and through an arc corresponding to the arcuate spacing of the individual ratchet teeth.

The projections 100, 100a of the collet RC support the spring 92 during this driving action so that a positive effect is exerted, with little outward movement of the spring end 92a; it being preferred, as shown, to have the initial contact of the end 92a with the radial face of the ratchet tooth occur at or at a small angle in front of the common plane m—n (Fig. 4) through the balance and transfer wheel axes, so that little or no inward rubbing motion along the ratchet tooth face occurs.

The transfer wheel tooth which engages the detent 90b presses the detent outward, and upon completion of the advancement, the detent has sprung back to engage the next succeeding tooth: this preferably occurring after about three-quarters of the duration of engagement of spring 92 with the tooth being driven, whereby there is assurance of advancement by one tooth during the power take-off action as thus far described. Thereafter, the end 92a of the spring 92 escapes from the driven ratchet tooth (Fig. 5), and the balance continues in its forward or counterclockwise stroke, gradually retarding and coming to a standstill as energy is stored in the hairspring HS.

Thereupon, the hairspring acts to return the balance in the return or clockwise stroke (direction of arrow in Fig. 6), but during this stroke in the illustrated form, the contact fin 50 merely moves the contact blade CB away from the fixed contact 60 so that no circuit is made and there is no impulsing during the return stroke. As the end 92a of the actuator spring 92 returns to the position of Fig. 5, it passes the ratchet tooth which has just been moved, but shortly thereafter engages with the next succeeding ratchet tooth and slips along the surface thereof while yielding relatively inwardly in a radial plane relative to the axis of the balance (from the dotted line to the full-line position of Fig. 6) until it escapes from this ratchet tooth, and thereafter continues in the return stroke of the balance until the succeeding turn-around, whereupon the hairspring again causes the balance to return in the next succeeding forward stroke, with a repetition of the foregoing effects.

The frictional effort exerted by the spring 92 upon the ratchet tooth during the retrograde or clockwise movement of the balance is very small, and retrograde movement of the transfer wheel TW is limited by the detent 90b. There is customarily a backlash between pinions and wheels of the train, which may be 7 degrees of relative permitted movement at the pinion 87, and this may in part or whole be consumed by the retrograde movement of the transfer wheel TW without backward movement of the hands, the train frictions serving to hold them in position.

In particular, it is not necessary that the ratchet teeth of the transfer wheel TW be accurately located after each advancement as they may successively occupy any part of an arc less than a tooth distance, noting that the actuator end 92a may move the tooth by more than the requisite movement of one tooth angle during the counterclockwise motion of the balance and prior to the escape of the end 92a from the actuated tooth, because the wheel TW may overrun the detent 90b (Fig. 5) during this action, and then be returned (Fig. 6) during the succeeding clockwise stroke; and yet the actuator 92 will cause an advancement by one tooth and one tooth only.

The fin 50 is at a fixed angular distance from the end 92a, so that the contact making and the train driving effect are procured at neutral axis; and so that this concurrence is not disturbed by adjustments of the collet relative to the balance staff.

A characteristic of the structure is that the numbers of teeth on the transfer wheel and on the pinion 87 may be different, so long as the train ratios properly coordinate the successive advancements so that the counting device, e. g. the hands, is moved at regular and usual rates. Likewise, the relative angular positions of the ratchet teeth and pinion teeth need not be accurately predetermined and invariable: it is feasible, for example, to relatively rotate the transfer wheel TW and the pinion 87 to a different relative angle without change of the counting effect as the transfer wheel automatically assumes appropriate successive positions, and thus such relative rotation can be employed to adjust the instant of the advancement cycle at which the detent 90a leaves an advancing ratchet tooth.

In the form shown in Figs. 7 and 8, a pallet 110 is fixed on a pallet staff 81 carried by bearings in the plate PP and a pallet bridge PB. The pallet has the usual fork with tines 20, 21 for cooperation with the roller or jewel pin 51 carried by the roller collet RC on the balance staff BS. Banking pins 22, 23 on the plate PP are positioned to limit the pallet movement.

A collet piece CP is fixed on the staff 81 to move therewith, and is made as in Figs. 9 and 10 with axial projections 100, 100a. A spring actuator member 92 as before has an arcuate form for about 270 degrees about the staff axis, with an angularly turned end 92b received in the notch 105 between two projections 100. The outer end 92a of the actuator 92 extends chordally and projects beyond the periphery of the collet CP, resting normally against the face of the projection 100a whereby its outward movement is restricted as before.

The collet CP has two adjacent elevations or humps 24, 25 on its periphery (Fig. 7) for engagement by the V-projection 26 of a pallet-locating spring 27 carried by the frictionally held stud 30 on plate PP. The pallet 110 has a projection 32 which supports a safety pin 33 cooperative with the safety collet 34 and its passing hollow 35 in the usual way: the collets RC and 34 may be made integral.

A transfer system comprises the transfer wheel TW connected in the counting train. The transfer wheel TW has ratchet teeth presented for engagement by the actuator 92. A detent 90b is fixed in a chordal groove in a rotatable friction stud 90 on the plate PP, and extends for contact with the successive teeth of the transfer wheel TW. A diametrical groove 90c in the stud 90 is kerf for screw-driver engagement, whereby the detent 90b may be shifted about the axis of the stud and thereby the position of the detent end and its pressure against the transfer wheel determined.

In operation, the balance wheel and staff oscillate and perform cycles of movement each including a forward stroke and a backward stroke. During the forward (here, clockwise) stroke, shown by the arrow in Fig. 7, at the neutral axis of oscillation and hence at the time of impulsing, the jewel pin 51 enters the notch in the pallet fork and then acts against the tine 21 to rock the pallet in a counterclockwise direction in Fig. 7, wherewith the collet piece CP turns and the end 92a of its actuator member presses against the radial face of a ratchet tooth of the transfer wheel TW and causes the same to advance, with permissible engagement through an angle preferably slightly greater than the angular spacing of the ratchet teeth. During this movement the ratchet tooth which has been engaged with the detent 90b presses the detent outward, and before the end of the transfer wheel movement, this tooth escapes from the detent 90b, which springs inward to engage the next tooth.

The movement of the pallet by the jewel pin 51 ceases when the jewel pin escapes from the pallet fork, but preferably the pallet is permitted a short further movement before it engages the banking pin 23. As the pallet swings, the safety pin 33 moves through the passing hollow 35 in the safety collet 34 in the usual way. Also, as the pallet begins to move from the position shown in Fig. 7, the hump 24 presses against the V-projection 26 and forces the same resiliently outward until the hump has passed the projection, whereupon the spring 27 acts to cause the V-projection 26 to accelerate the hump 24 and therewith the pallet toward the pallet position of contact with the banking pin 23, and thereafter to hold the pallet against the banking pin 23 ready for receiving the jewel pin 51 in the return stroke.

During the backward or return stroke of the cycle, the balance again causes the jewel pin 51 to enter the pallet fork, but now from the opposite direction, to return the pallet from banking pin 23 until it now engages the banking pin 22; and the pin then escapes from the pallet and continues to the end of the return stroke. During the return or counterclockwise rocking of the pallet, its actuator end 92a slides along the chordal face of the ratchet tooth behind the radial face previously driven, and slips therefrom to the chordal face of the next succeeding tooth shortly before the jewel pin 51 escapes from the pallet fork. The transfer wheel TW may make a slight retrograde movement during this time, but cannot return to its prior position because of the action of the detent 90b: it being noted that the backlash in the train between the pinion 87 and the seconds hand, for example, may be about 7 degrees at the pinion, so that the retrograde movement has no influence upon the hand motion. The safety pin 33 again moves through the passing hollow 35: and the cooperative action of hump 24 and V-projection 26 causes the pallet to move to and bear against the banking pin 22.

During the impulsing of the balance system, if a shock or twisting movement occurs simultaneously, the energy delivered may be greater than for merely maintaining the balance motion at a desired amplitude, e. g. 1½ turns, and may be great enough to produce an inertia effect equal to two turns or more. If such movement were permitted, then the jewel pin 50 would again strike the contact blade CB and cause a second impulsing during the single forward stroke, thereby not only badly affecting the rate of the balance, but failing to produce a proper counting action in the train. In the structure shown in Figs. 7 and 8, such an event of tentative "overbanking" or excess amplitude of motion cannot lead to a second impulsing because the jewel pin 51 will strike an outer surface of the pallet fork and thus the balance system be brought to a standstill.

In each form of practice, a resilient piece is caused to act as a traveling pawl to cause a transfer member to advance during a forward stroke, and the pawl slips past the transfer member during the return stroke. In the illustrative embodiments, this resilient piece is a blade spring member which is curled in a plane and received in a recess or groove of a part moved during the balance motion, and held therein by its own resiliency and by bounding surfaces provided by the recess, so that the parts can be easily separated, cleaned, and re-assembled.

It is obvious that the invention is not limited to the specific forms of construction shown and described, but that it may be employed in many ways within the scope of the appended claims.

We claim:

1. In a power take-off for a device having an oscillatory system and a driven system, the combination of an element oscillated in time with said oscillating system, said element having a peripheral projection at one end defining a cavity, said element having a passage through the said projection from the cavity to the outer peripheral surface, said passage having an upright wall surface, a spring curved in a plane and having parts seated by its resiliency, in the cavity and passage and against the projection and said upright wall surface with the outer spring end extending beyond said outer surface, and a transfer wheel connected for moving said driven system and having its axis parallel to the axis of said element and having teeth located in the plane of the spring and for presentation successively in the path of movement of said spring end for actuation thereby during forward transfer strokes of said element, said spring end being movable in said plane by the successive teeth in a direction away from said upright wall surface whereby the spring end can pass the teeth during return strokes of said element.

2. A power take-off as in claim 1, in which the spring has an outwardly turned inner end, said element having a notch extending from the cavity to the outer peripheral surface, said notch receiving said outwardly turned inner end.

3. In a power take-off for a device having an oscillatory system and a driven system, the combination of an element oscillated in time with the oscillatory system, and having a cavity in its end and a passage with a chordal wall at one side of the passage, said passage extending from the cavity to the outer surface of the element, a blade spring in the cavity and supported by the element to move therewith and having a part resting normally by its resiliency against the chordal wall and occupying a part of said passage wherewith said part of the spring can be moved away from the chordal wall, and said spring part having an end projecting from the passage and beyond the outer surface of the element, and a transfer wheel mounted with its axis parallel to the axis of said element and connected for moving the driven system, said transfer wheel having ratchet teeth located in the plane of and for presentation successively in the path of said spring end for movement thereby during strokes of said element, said teeth being successively effective upon said spring end during such transfer movement for pressing said spring part toward the chordal wall during transfer strokes of said element and being effective during the return stroke of the element for moving said spring part away from the chordal wall whereby the spring end can pass the presented tooth.

4. A power take-off as in claim 3, in which a detent spring is provided to engage the ratchet teeth and prevent excessive retrograde movement of the transfer wheel, and to slip from tooth to tooth prior to the completion of the said transfer movement.

5. In a power take-off for a device including an oscillatory system and a driven system, said oscillatory system having an oscillatory shaft, the combination of a collet frictionally mounted on the staff, said collet at one end face having a cavity surrounding the staff, said cavity extending as a recess beneath an inwardly projecting part of the collet, said collet having a passage with its floor at the level of the cavity floor and extending from the cavity to the outer surface of the collet, said collet also having a notch intersecting the recess; a spring having a curved part seated in the recess, an outwardly extending end in said notch, and the other end in said passage and projecting therefrom, said spring being located in the recess and against said floor and said part and thereby held against motion out of a radial plane relative to the collet axes; and means advanced step-wise by said other spring end during oscillations of said element and connected for moving the driven system.

6. In a power take-off for a device having an oscillatory system and a driven system, the combination of a rockable element including a pallet piece moved back and forth by the oscillatory system, said piece having a cavity in its end wall and a passage extending from the cavity to the outer peripheral surface, said passage having a chordal wall, a blade spring curved in a plane and carried by said element and having a part located in said passage and normally engaged by its resiliency with said chordal wall and movable to and from said chordal wall, said spring part having an end projecting beyond the peripheral surface, and a transfer wheel mounted with its axis parallel to the axis of said element and connected for moving the driven system and having teeth located in the plane of and for presentation successively in the path of said spring end for advancement thereby during transfer strokes of the pallet piece, said teeth being effective during return strokes of the pallet piece for engaging the spring end and moving said spring part in the said plane and away from the chordal wall whereby the spring end can pass the respective teeth.

7. In a power take-off for an instrument having an oscillatory system and a driven system, the combination of an element oscillated in time with the oscillatory system, a blade spring curved in a radial plane of the element and carried by the element and having a projecting end moved in an arcuate path with the element, said element including a stop for limiting relative peripheral motion of the spring end during the transfer strokes of its oscillated movement, said spring end being free to move relatively inwardly and peripherally away from the stop during the return strokes of its oscillated movement, and a transfer wheel mounted with its axis parallel to the axis of the rockable element and connected for moving the driven system and having teeth located in the plane of and for presentation successively in the said arcuate path for actuation step-wise by said projecting end during transfer strokes of said element, said teeth being effective during return strokes of the said element for bending the spring in its plane and moving said spring end away from said stop.

8. In a power take-off for a device having an oscillatory system and a driven system, the combination of an element oscillated in time with said oscillatory system, said element having a cavity in one face, said element having an internal peripheral recess in its peripheral wall with said recess extending from said cavity, said element having a passage from the cavity to its outer surface, a blade spring curved in a plane and having parts seated by its resiliency against recess and passage wall surfaces with an outer spring end projecting beyond said outer surface, and a transfer member connected for moving said driven system and having teeth located in the plane of and for presentation successively in the path of movement of said outer spring end.

9. In a power take-off for a device including an oscillating balance system and a driven system, said oscillatory system having an oscillatory staff, the combination of a collet frictionally mounted on the staff, said collet having at one end face a cavity surrounding the staff, said collet having inwardly projecting flange means providing a recess forming part of the cavity, said recess having an outer wall provided by an inner surface of the collet, said collet having a passage with its floor at the level of the cavity floor and extending from the said inner surface to the outer surface of the collet, said passage having an upright wall surface, said collet also having a notch intersecting the recess; a blade spring curved in a plane and having a curved portion extending about the staff axis and seated by its own resiliency against said collet inner surface between the cavity floor and said flange means, said spring having an outwardly extending portion in said notch, said spring at its other end having an extension bearing resiliently against one said passage wall surface and projecting beyond the outer surface of the collet; and means advanced step-wise by said other spring end during one oscillating stroke of said element and connected for moving the driven system, said means being effective to produce a relatively inward movement of the said other spring end in its said plane away from said upright wall surface and toward the axis of the staff during the return oscillation stroke.

References Cited in the file of this patent

UNITED STATES PATENTS

| 1,828,507 | Murphy | Oct. 20, 1931 |
| 2,084,226 | Strahan | June 15, 1937 |
| 2,266,015 | Fink | Dec. 16, 1941 |
| 2,305,666 | Bolsey | Dec. 22, 1942 |
| 2,705,428 | McCullough | Apr. 5, 1955 |

FOREIGN PATENTS

| 492,021 | Great Britain | Sept. 13, 1938 |
| 550,966 | Great Britain | Feb. 2, 1943 |
| 748,565 | France | Apr. 18, 1933 |